Feb. 24, 1925.

F. HUTCHINSON

SAW GUARD

Filed Dec. 7, 1923 2 Sheets-Sheet 1

1,527,587

Inventor:
Frank Hutchinson,
By
Robert W. Randle,
Attorney.

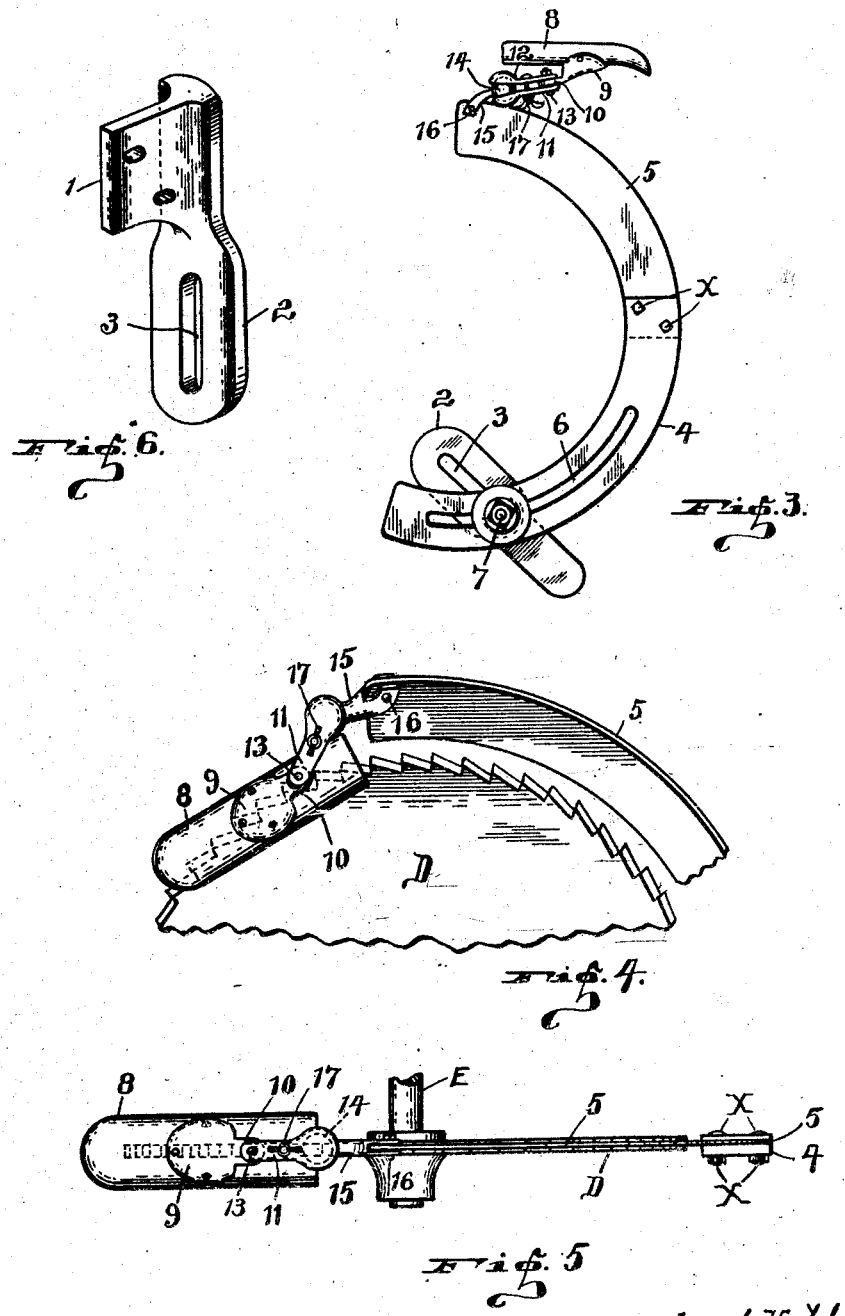

Patented Feb. 24, 1925.

1,527,587

UNITED STATES PATENT OFFICE.

FRANK HUTCHINSON, OF MILTON, INDIANA.

SAW GUARD.

Application filed December 7, 1923. Serial No. 679,256.

*To all whom it may concern:*

Be it known that I, FRANK HUTCHINSON, a citizen of the United States, residing in the town of Milton, in the county of Wayne, State of Indiana, have invented a new and useful Saw Guard, of which the following is a full, clear, and comprehensive specification and exposition, the same being such as will enable others to make, install, and use the same with exactitude.

The object of my present invention, broadly speaking, is to provide a saw-guard which is simple in construction, strong and durable in its several parts, positive in its results, easily applied in operative condition, which will not interfere with the work being performed with the saw which it guards, and which can be manufactured and sold at a comparatively low price.

More specifically stated, my object is to provide a guard especially adapted to be used in connection with circular sawing machines wherein the saw is adapted to be turned laterally at various angles for sawing miters or other kinds of angular work, with means whereby the guard will always be in the same relation, guarding the saw, regardless of the position to which the saw may be turned or to the position which it may be adjusted.

Other objects and particular advantages of the invention will suggest themselves in the course of the following specification.

Figure 1:
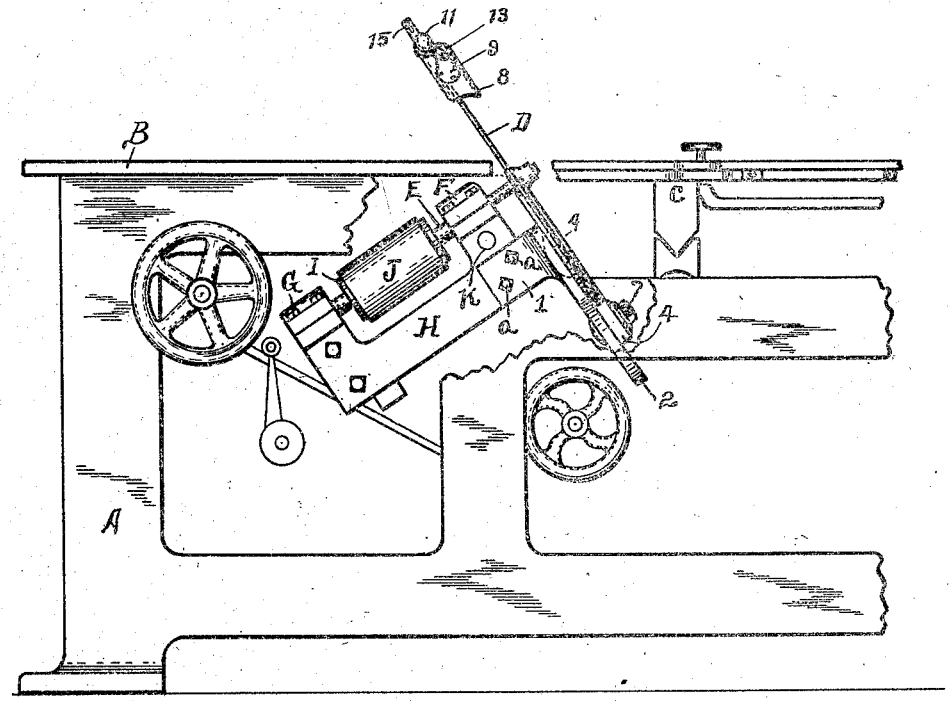
Figure 2:
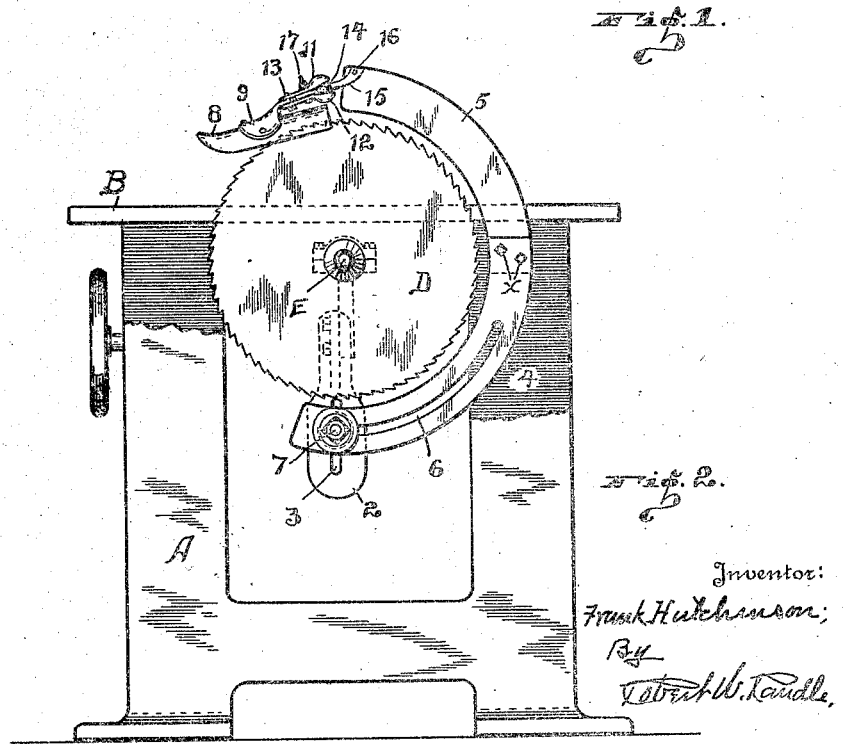

Referring now to the drawings: Figure 1 is a front elevation of a sawing-machine, the saw being turned at an angle, and showing an edge view of my invention in operative position in connection therewith. Figure 2 is an end elevation of a portion of the machine, the saw being shown as adjusted to vertical position, and showing a side elevation of my invention in operative position. Figure 3 is a side elevation of my device alone, and as taken on an enlarged scale from that of Figs. 1 and 2. Figure 4 is a top plan of a portion of the saw and the guard as they would appear when the device and the saw are adjusted to position as shown in Fig. 1. Figure 5 is a top plan of the same when said parts are adjusted to the positions shown in Fig. 2, and Figure 6 is a perspective view of the hanger alone.

Similar indices denote like parts throughout the several views.

In order that the construction, the operation, and the advantages of my invention may be more fully understood and appreciated, I will now take up a detailed description thereof, in which I will set forth the same as comprehensively as I may.

Referring now to the drawings in detail: Letter A denotes the frame or body portion of a sawing machine, the same having a relatively stationary table or top B, and a forwardly and rearwardly sliding carriage C which has a flat top located on a level with the top of the table C, there being a space between the table B and the top of the carriage C in which operates the circular saw D. Said saw is secured on the shaft E. Said shaft is mounted revolvably in the boxings F and G which are carried by the bracket H. Letter I denotes a pulley secured on and concentric with the shaft E, and located between the boxings F and G. Said shaft, carrying the saw, is adapted to be rotated by power transmitted through the belt J which operates over said pulley as shown. Said bracket H is mounted to turn on a pivot or shaft K whereby the saw may be turned at the angle desired and there maintained.

All of said parts are old and they are merely shown in order to make clear the purposes of my invention and its application thereto.

The invention proper includes a hanger, comprising the base or flange portion 1, which is detachably secured to the bracket H at its lower right corner, that is below the bearing F, by means of screws *a*, or otherwise. Said hanger also includes the flat body portion 2, which is turned at right angles to the part 1, and it extends downward with its right face parallel with the saw and located near to the left face of the saw substantially as shown. Said body portion 2 has a slot 3 therein, extending parallel thereof and the purpose thereof will be hereinafter set forth. At this point I desire that it be understood that the said hanger may be variously changed to meet various conditions, as its function is merely to provide the connecting link between the essential members of my invention and the machine, and as there are various types of machines on which my invention may be employed, therefore the shape of such connection depends on the various conditions to be encountered.

The guard proper consists of two segmental members 4 and 5, of substantially the same length and width. However the member 4 is of greater thickness than the saw D, while the member 5 is of less thickness than the saw. Said members 4 and 5 are spliced together at their adjoining ends where they are secured as by means of the bolts X, the member 5 being directly in the center, laterally, of the member 4. The two members 4 and 5 together form approximately a half circle, corresponding with the circle formed by the saw, but spaced therefrom, whereby the inner edges of the guard members will be an equal distance at all points from the periphery of the saw, substantially as shown in Fig. 2.

A slot 6 is formed in the member 4, parallel therewith, and extending more than half the length thereof.

Numeral 7 denotes a bolt which extends through the slot 3 and the slot 6, whereby the members 2 and 4 may be rigidly secured together as in Fig. 2. The slots 3 and 6 afford means whereby the guard may be adjusted to meet various conditions.

The member 4 should extend from its connection with the hanger upward and rearward to near the underside of the table or top, being of such thickness as to afford the desired rigidity, while the upper member or blade 5 must be comparatively thin, in order that it may easily operate in the kerf formed by the saw as the material being sawed passes to the rear of the saw.

The guard thus formed will protect more than half of the periphery of the saw and it may be formed to extend over even a greater extent if found desirable so to do.

I also provide an auxiliary guard, which comprises the oval shoe 8, which is in the nature of an inverted U in cross section, being elongated, with its forward end portion rounded and curved upwardly substantially as shown.

Secured on the top of the central portion of the shoe 8 is a bracket 9 having a rearwardly extending tongue 10.

Numerals 11 and 12 denote the two members of a clamp, said members 11 and 12 being identical with each other but they are oppositely disposed with relation to each other, their stems being located above and underneath, respectively, of the tongue 10, to which they are pivotedly connected by the pivot-bolt 13. Sockets are formed in the opposing faces of the enlarged rear ends of the members 11 and 12 to receive the ball 14. Said ball is formed integral with the curved neck 15. Said neck has a slot therein in which may fit the blade 5, and said neck is pivoted to the upper forward corner of the blade 5 by the bolt or rivet 16. A thumb bolt 17 extends through the central portions of the members 11 and 12 whereby they may be clamped upon the ball 14.

From the above it is apparent that I provide an adjustable guard for circular saws which saws are adjustable laterally to attain various inclinations for sawing miters or bevels or the like, the guard being so arranged that it always moves with the saw when the saw is being adjusted, thereby so guarding the saw that accidents are reduced to a minimum.

The auxiliary guard is provided as a special precautionary feature, and it can be easily adjusted as desired by the operator or to meet various conditions for the work in hand.

When the saw is to be operated in vertical position, as in Figs. 2 and 5 then the auxiliary guard is to be perfectly straight, as in Fig. 5, but when the saw is placed at an angle then the auxiliary guard should be turned as in Fig. 4, whereby it will protect the workman from dust, splinters, or the like. The auxiliary guard can be adjusted as desired by means of the specific construction above set forth, or the equivalents thereof, that is the shoe 8 may be turned universally to the right or the left or moved bodily to the right or left, or it may be raised or lowered, however the inner end of the slot in the neck 15 will always prevent the shoe from contacting with the saw. And when so desired the auxiliary guard may be turned upward and rearward out of the way, as shown in Fig. 3.

I desire that it be understood that various changes may be made in the several details of construction from that herein shown and described without departing from the spirit of the invention and without sacrificing any of the advantages thereof which are new and useful and which involve invention.

Having now fully shown and described my invention, what I claim and desire to secure by Letters Patent of the United States, is—

1. In combination with a sawing machine including a bracket carrying the saw, means for adjusting the bracket to change the inclination of the saw, and a table above which, a portion of saw extends; a curved guard extending around the periphery of the saw and spaced therefrom, an auxiliary guard pivoted to the upper forward end of the said guard, means for universally mounting said auxiliary guard whereby it may be adjusted to the inclination of the saw.

2. In combination with a sawing machine having a bracket for carrying the saw, means for permitting the changing of the position of said bracket to adjust the inclination of the saw, and a table above which a portion of the saw extends; a hanger secured to said bracket, a main guard for the saw, a shoe forming an auxiliary guard for the saw, a bracket secured on top of the central portion of the shoe, a tongue extending rearwardly from said bracket, a two-part clamp pivoted to said tongue, a ball operative in sockets formed in the faces of the members of said clamp, a neck integral with said ball, and means for pivotedly connecting said neck to the upper end of said main guard.

FRANK HUTCHINSON.